(12) United States Patent
Cann et al.

(10) Patent No.: US 7,326,760 B2
(45) Date of Patent: Feb. 5, 2008

(54) PRODUCTION OF BROAD MOLECULAR WEIGHT POLYETHYLENE

(75) Inventors: Kevin J. Cann, Rocky Hill, NJ (US); Minghui Zhang, Hillsborough, NJ (US); John H. Moorhouse, Kendall Park, NJ (US); Maria A. Apecetche, Bridgewater, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/343,538

(22) Filed: Jan. 31, 2006

(65) Prior Publication Data

US 2006/0183630 A1 Aug. 17, 2006

Related U.S. Application Data

(62) Division of application No. 10/762,494, filed on Jan. 22, 2004, now abandoned.

(60) Provisional application No. 60/450,395, filed on Feb. 26, 2003.

(51) Int. Cl.
*C08F 4/24* (2006.01)
*C08F 110/02* (2006.01)

(52) U.S. Cl. ............... 526/352; 526/106; 526/113; 526/124.5; 502/103; 502/113; 502/114; 502/116

(58) Field of Classification Search ............... 526/352, 526/124.2, 124.3, 124.5, 106, 113; 502/103, 502/116, 113, 114
See application file for complete search history.

(56) References Cited

U.S. PATENT DOCUMENTS

| | | | |
|---|---|---|---|
| 3,324,095 A | 6/1967 | Carrick et al. | 260/88.2 |
| 3,324,101 A | 6/1967 | Baker et al. | 260/94.9 |
| 3,629,216 A | 12/1971 | Iwasaki et al. | 260/88.2 |
| 3,759,918 A * | 9/1973 | Yamaguchi et al. | 526/105 |
| 3,767,635 A | 10/1973 | Yamaguchi et al. | 260/88.2 |
| 4,153,576 A | 5/1979 | Karol et al. | 252/428 |
| 4,451,573 A * | 5/1984 | Ikegami et al. | 502/113 |
| 4,454,242 A * | 6/1984 | Ikegami et al. | 502/113 |
| 4,559,394 A | 12/1985 | Jackson | 528/102 |
| 5,075,395 A | 12/1991 | Durand et al. | 526/105 |
| 6,107,236 A | 8/2000 | Pecoraro et al. | 502/233 |
| 6,989,344 B2 | 1/2006 | Cann et al. | |
| 2002/0042428 A1 | 4/2002 | Myers et al. | 514/305 |

FOREIGN PATENT DOCUMENTS

| | | |
|---|---|---|
| CN | 1214344 | 4/1999 |
| JP | 201198811 | 7/2001 |
| JP | 2001294612 | 10/2001 |
| JP | 2002020412 | 1/2002 |
| WO | WO 01/94428 | 12/2001 |
| WO | WO 01/94428 A1 * | 12/2001 |

\* cited by examiner

*Primary Examiner*—Ling-Sui Choi
(74) *Attorney, Agent, or Firm*—Kevin M. Faulkner; Leandro Arechederra

(57) ABSTRACT

Broad molecular weight polyethylene and polyethylene having a bimodal molecular weight profile can be produced with chromium oxide based catalyst systems employing alkyl silanols. The systems may also contain various organoaluminum compounds. Catalyst activity and molecular weight of the resulting polyethylene may also be tuned using the present invention.

28 Claims, 8 Drawing Sheets

Silylchromate on silica

Cr+6 Oxide on silica

US 7,326,760 B2

PRODUCTION OF BROAD MOLECULAR WEIGHT POLYETHYLENE

CROSS-REFERENCE TO RELATED APPLICATION

The present application is a divisional application of U.S. Ser. No. 10/762,494, filed Jan. 22, 2004, now abandoned, which claims the benefit of U.S. Ser. No. 60/450,395, filed Feb. 26, 2003, the disclosure of which is incorporated by reference.

TECHNICAL FIELD

The present invention relates to the use of chromium-based catalysts with alkyl silanols such as triphenyl silanol with or without aluminum alkyl activators. The use of aluminum alkyls and alkyl silanols allows for the control of polymer molecular weight and molecular weight distribution and results in a catalyst with behavior similar to silylchromate on silica catalyst. Bimodal polyethylene may be produced with the present invention.

BACKGROUND OF THE INVENTION

Ethylene polymers have been used generally and widely as resin materials for various molded articles and are required to have different properties depending on the molding method and purpose. For example, polymers having relatively low molecular weights and narrow molecular weight distributions are suitable for articles molded by an injection molding method. On the other hand, polymers having relatively high molecular weights and broad molecular weight distributions are suitable for articles molded by blow molding or inflation molding. In many applications, medium-to-high molecular weight polyethylenes are desirable. Such polyethylenes have sufficient strength for applications which call for such strength (e.g., pipe applications), and simultaneously possess good processability Ethylene polymers having broad molecular weight distributions can be obtained by use of a chromium catalyst obtained by calcining a chromium compound carried on an inorganic oxide carrier in a non-reducing atmosphere to activate it such that at least a portion of the carried chromium atoms is converted to hexavalent chromium atoms (Cr+6). This is commonly referred to in the art as the Phillips catalyst. The respective material is impregnated onto silica, fluidized and heated in the presence of oxygen to about 400° C.-860° C., converting chromium from the +3 oxidation state to the +6 oxidation state. A second chromium catalyst used for high density polyethylene applications consists of silylchromate(bis-triphenylsilyl chromate) absorbed on dehydrated silica and subsequently reduced with diethylaluminum ethoxide (DEALE). The resulting polyethylenes produced by each of these catalysts are different in some important properties. Chromium oxide-on-silica catalysts have good productivity (g PE/g catalyst), also measured by activity (g PE/g catalyst-hr) but produce polyethylenes with molecular weight distributions lower than that desired for certain applications. Silylchromate-based catalysts produce polyethylenes with desirable molecular weight distribution characteristics (broader molecular weight distribution with a high molecular weight shoulder on molecular weight distribution curve, indicative of two distinct molecular weight populations).

Monoi, in Japanese Patent 200202412 discloses the use of inorganic oxide-supported Cr+6-containing solid components (A) prepared by sintering under nonreducing conditions, dialkylaluminum functional group-containing alkoxides (B), and trialkylaluminum (C). The resulting ethylene polymers are said to possess good environmental stress crack resistance and good blow molding creep resistance. U.S. Application 2002042428 discloses a method of ethylene polymerization in co-presence of hydrogen using a trialkylaluminum compound-carried chromium catalyst (A), wherein the chromium catalyst is obtained by calcination-activating a Cr compound carried on an inorganic oxide carrier in a non-reducing atmospheric to convert Cr atoms into the hexavalent state and then treating A with a trialkylaluminum compound in an inert hydrocarbon solvent and removing the solvent in a short time.

Hasebe et al. Japanese Patent 2001294612 discloses catalysts containing inorganic oxide-supported Cr compounds calcined at 300° C.-1100° C. in a nonreducing atmosphere, $R_{3-n}AlL_n$ (R=C1-12 alkyl; L=C1-8 alkoxy, phenoxy; 0<n<1), and Lewis base organic compounds. The catalysts are said to produce polyolefins with high molecular weight and narrow molecular weight distribution.

Hasebe et al., in Japanese Patent 2001198811 discloses polymerization of olefins using catalysts containing Cr oxides (supported on fire resistant compounds and activated by heating under nonreductive conditions) and $R_{3-n}AlL_n$ (R=C1-6 alkyl; L=C1-8 alkoxy, phenoxy; n>0.5 but<1). Ethylene is polymerized in the presence of $SiO_2$-supported $CrO_3$ and a reaction product of a 0.9:1 MeOH-$Et_3Al$ mixture to give a polymer with melt index 0.18 g/10 min at 190° C. under 2.16-kg load and 1-hexene content 1.6 mg/g-polymer.

Da, et al, in Chinese Patent 1214344 teaches a supported chromium-based catalyst for gas-phase polymerization of ethylene prepared by impregnating an inorganic oxide support having hydroxyl group on the surface with an inorganic chromium compound aqueous solution; drying in air; activating the particles in oxygen; and reducing the activated catalyst intermediate with an organic aluminum compound. 10 g commercial silica gel was mixed with 0.05 mol/L $CrO_3$ aqueous solution, dried at 80-120° C. for 12 h, baked at 200° C. for 2 h and 600° C. for 4 h, reduced with 25% hexane solution of diethylethoxyaluminum to give powder catalyst with Cr content 0.25% and Al/Cr ratio of 3.

Durand, et al, U.S. Pat. No. 5,075,395, teaches a process for elimination of the induction period in the polymerization of ethylene by bringing ethylene in contact under fluidized-bed polymerization conditions and/or stirred mechanically, with a charge powder in the presence of a catalyst comprising a chromium oxide compound associated with a granular support and activated by thermal treatment, this catalyst being used in the form of a prepolymer. The Durand process is characterized in that the charge powder employed is previously subjected to a treatment by contacting the said charge powder with an organoaluminum compound, in such a way that the polymerization starts up immediately after the contacting of the ethylene with the charge powder in the presence of the prepolymer.

McDaniel, in U.S. Pat. No. 4,559,394 teaches the polymerization of olefins using activated chromium catalysts and tertiary alcohols. These patents teach the addition of alcohols to chromium oxide to improve chromium distribution. McDaniel adds the tertiary alcohol prior to catalyst activation. Interestingly, McDaniel teaches that silanols do not work to achieve this end.

U.S. Pat. Nos. 4,454,242 and 4,451,573 to Ikegami, et al, employ silanols in conjunction with chromium oxide catalysts treated with zirconium or titanium and alkylmagnesium compounds to make improved environmental stress crack resistance (ESCR) products.

Chromium catalysts based on chromocene and silanols have been prepared and deposited on silica to increase catalyst activity as taught in U.S. Pat. No. 4,153,576 to Karol et al. U.S. Pat. Nos. 3,767,635; 3,629,216; and 3,759,918, assigned to Mitsubishi Chemical Industries, Ltd., teach the addition of pentaalkylsiloxyalanes to supported chromium oxide catalysts to make useful polyethylenes.

Chromium oxide (CrOx) based catalysts have high activity with moderate induction times and produce polymers with high molecular weights and intermediate molecular weight distributions. Silylchromate-based catalysts have poorer activity, but produce polymers with a broader molecular weight distribution. Silylchromate catalysts are typically more costly than chromium oxide catalysts. It would be desirable to have a method that allows for the tuning of chromium oxide based catalysts such that the polymers produced by them approach the characteristics of polymers produced using silylchromate-based catalysts. For background information regarding silylchromate catalysis, see e.g., U.S. Pat. Nos. 3,324,095 and 3,324,101 to Carrick et al. The prior art lacks an inexpensive, facile method for modifying a chromium oxide catalyst such that polymer produced by it can be variably tuned to approach polymer produced by silylchromate-based catalyst systems. Additionally, the prior art is devoid of any teaching of the use of silanols in a two-catalyst system to obtain polymers with bimodal molecular weight distribution profiles.

While the prior art contains these and other examples of the use of modified Phillips-type catalysts, there has not yet been disclosed a method for the control of molecular weight distribution. The present invention provides a method for the production of polyethylene characterized by the control of both the molecular weight and the breadth of molecular weight distribution. The present invention also provides a method to produce a bimodal polyethylene through the use of two chromium-based catalyst systems.

SUMMARY OF THE INVENTION

The present invention is directed to a system and method for the polymerization ethylene using chromium-based catalysts with control of molecular weight and molecular weight distribution. It also provides for the production of bimodal polyethylene through the use of catalyst systems having two chrome catalysts.

In one aspect of the present invention, there is a supported chromium catalyst comprising chromium oxide, a silica-containing support comprising silica selected from the group consisting of silica having (a) a pore volume of about 1.1-1.8 cm$^3$/g and a surface area of about 245-375 m$^2$/g, (b) a pore volume of about 2.4-3.7 cm$^3$/g and a surface area of about 410-620 m$^2$/g, and (c) a pore volume of about 0.9-1.4 cm$^3$/g and a surface area of about 390-590 m$^2$/g, and an alkyl silanol, wherein the supported chromium catalyst is activated at 400-860° C., prior to the addition of said alkyl silanol.

In another embodiment, the catalyst further comprises titanium tetraisopropoxide. In another embodiment, the catalyst further comprises an organoaluminum compound. In a specific embodiment having an organoaluminum compound, the activated chromium catalyst is treated first with the alkyl silanol and then with the organoaluminum compound. In another specific embodiment having an organoaluminum compound, the silica has a pore volume of about 2.4-3.7 cm$^3$/g and a surface area of about 410-620 m$^2$/g and said organoaluminum compound is an alkyl aluminum alkoxide compound. In yet another specific embodiment having an organoaluminum compound, the silica has a pore volume of about 1.1-1.8 cm$^3$/g and a surface area of about 245-375 m$^2$/g, and said organoaluminum compound is an alkyl aluminum alkoxide compound. In another specific embodiment having an organoaluminum compound, the organoaluminum compound is added in-situ. In yet another specific embodiment having an organoaluminum compound, the catalyst further comprises at least a second chromium-based compound. In a specific embodiment having at least a second chromium-based compound, the second chromium-based compound is a chromium oxide on silica or an organoaluminum-reduced chromium oxide on silica.

In another embodiment of the catalyst having an organoaluminum compound, the alkyl silanol or the organoaluminum compound or both the alkyl silanol and the organoaluminum compound are added in-situ. In a specific embodiment, the alkyl silanol and the organoaluminum compound are pre-mixed prior to said in-situ addition.

In another embodiment of the catalyst having an organoaluminum compound, the organoaluminum compound is an alkyl aluminum alkoxide compound. In a specific embodiment, the alkyl aluminum alkoxide compound is diethyl aluminum ethoxide. In another specific embodiment, the catalyst having an alkyl aluminum alkoxide compound is formed by the in situ addition of said alkyl aluminum alkoxide compound. In a specific embodiment, the alkyl aluminum alkoxide compound is diethyl aluminum ethoxide.

In another embodiment of the catalyst having an organoaluminum compound, the organoaluminum compound is an alkyl aluminum compound. In a specific embodiment, the alkyl aluminum compound is selected from the group consisting of triethyl aluminum, tri-isobutyl aluminum, and tri-n-hexyl aluminum. In another specific embodiment, the catalyst is formed by the in situ addition of the alkyl aluminum compound. In yet another specific embodiment, the alkyl aluminum compound added in-situ is tri-isobutyl aluminum.

In another embodiment of the supported chromium catalyst, the catalyst is activated at 600-860° C. In another embodiment of the supported chromium catalyst, the alkyl silanol is triphenyl silanol.

In the present invention, there is also a supported chromium catalyst comprising chromium oxide, a silica-containing support comprising silica selected from the group consisting of silica having (a) a pore volume of about 1.1-1.8 cm$^3$/g and a surface area of about 245-375 m$^2$/g, (b) a pore volume of about 2.4-3.7 cm$^3$/g and a surface area of about 410-620 m$^2$/g, and (c) a pore volume of about 0.9-1.4 cm$^3$/g and a surface area of about 390-590 m$^2$/g and, an organoaluminum compound, wherein the supported chromium catalyst is activated at 400-860° C.

In a specific embodiment, the organoaluminum compound is diethyl aluminum triethylsiloxide. In another embodiment, the catalyst further comprises titanium tetraisopropoxide.

Also in the present invention, there is a supported chromium catalyst comprising chromium oxide, a silica-containing support comprising silica selected from the group consisting of silica having (a) a pore volume of about 1.1-1.8 cm$^3$/g and a surface area of about 245-375 m$^2$/g, (b) a pore volume of about 2.4-3.7 cm$^3$/g and a surface area of about 410-620 m$^2$/g, and (c) a pore volume of about 0.9-1.4 cm$^3$/g and a surface area of about 390-590 m$^2$/g wherein said supported chromium catalyst is activated at 400-860° C., and, a second chromium-based compound comprising silylchromate on silica treated with an organoaluminum compound. In a specific embodiment, the chromium oxide catalyst component is treated with an organoaluminum compound after activation. In another embodiment, the catalyst further comprises titanium tetraisopropoxide.

In the present invention, there is also a process for producing an ethylene polymer comprising the steps of contacting ethylene under polymerization conditions with a catalyst system, said catalyst system comprising chromium oxide, an alkyl silanol compound, and a silica-containing support comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$ and, controlling one or more of catalyst activity, polymer Mz/Mw, polymer Mw/Mn, and polymer density of the resulting ethylene polymer by varying the level of addition of said alkyl silanol.

In one embodiment of the process the polymer Mw/Mn is controlled to greater than about 15 and the polymer Mz/Mw is controlled to greater than about 5. In another embodiment of the process, the catalyst system further comprises an organoaluminum compound. In a specific embodiment of the process where the catalyst system further comprises organoaluminum, the catalyst system further comprises at least a second chromium-based catalyst. In a specific embodiment of the process where the catalyst system further comprises a second chromium-based catalyst, the second chromium-based compound is a chromium oxide on silica or an organoaluminum-reduced chromium oxide on silica. In another specific embodiment of the process where the catalyst system further comprises a second chromium-based catalyst, the organoaluminum compound is an alkyl aluminum alkoxide. In another embodiment wherein the organoaluminum compound is an alkyl aluminum alkoxide, the alkyl aluminum alkoxide is diethylaluminum ethoxide. In another embodiment, the organoaluminum compound is an alkyl aluminum compound. In another embodiment of the process using alkyl aluminum compound, the alkyl aluminum compound is selected from the group consisting of triethyl aluminum, tri-isobutyl aluminum, and tri-n-hexyl aluminum. In another embodiment of the process, the catalyst system further comprises titanium tetraisopropoxide.

In another embodiment, there is a process for producing an ethylene polymer comprising the steps of contacting ethylene under polymerization conditions with a catalyst system, said catalyst system comprising chromium oxide, a silica-containing support comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$ wherein the supported chromium catalyst is activated at 400-860° C. and, a second chromium-based compound comprising silylchromate on silica treated with an organoaluminum compound and, controlling one or more of polymer molecular weight, polymer Mz/Mw, polymer Mw/Mn, and distribution of comonomer incorporation by varying the relative amount of each of the chromium oxide and the second chromium-based compound. In another embodiment of the process the chromium oxide catalyst component is treated with an organoaluminum compound after activation. In another embodiment, the catalyst system further comprises titanium tetraisopropoxide.

There is also an ethylene polymer having a density of 0.918-0.970 $g/cm^3$ and a flow index (I21) of 1-500 and produced by the process comprising the steps of contacting ethylene under polymerization conditions with a catalyst system, the catalyst system comprising chromium oxide, an alkyl silanol compound, and a silica-containing support comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$; and, controlling one or more of catalyst activity, polymer Mz/Mw, polymer Mw/Mn, and polymer density of the resulting ethylene polymer by varying the level of addition of the alkyl silanol.

In another embodiment, there is an ethylene polymer having a density of 0.918-0.970 $g/cm^3$ and a flow index (I21) of 1-500 and produced by the process comprising the steps of contacting ethylene under polymerization conditions with a catalyst system, the catalyst system comprising chromium oxide, an alkyl silanol compound, an organoaluminum compound, and a silica-containing support comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$; and, controlling one or more of catalyst activity, polymer Mz/Mw, polymer Mw/Mn, and polymer density of the resulting ethylene polymer by varying the level of addition of the alkyl silanol.

In another embodiment, there is an ethylene polymer having a density of 0.918-0.970 $g/cm^3$ and a flow index (I21) of 1-500 and produced by the process comprising the steps of contacting ethylene under polymerization conditions with a catalyst system, the catalyst system comprising chromium oxide, an alkyl silanol compound, an organoaluminum compound, at least a second chromium-based catalyst, and a silica-containing support comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$; and, controlling one or more of catalyst activity, polymer Mz/Mw, polymer Mw/Mn, and polymer density of the resulting ethylene polymer by varying the level of addition of the alkyl silanol.

In another embodiment, there is an ethylene polymer having a density of 0.918-0.970 $g/cm^3$ and a flow index (I21) of 1-500 and produced by the process comprising the steps of contacting ethylene under polymerization conditions with a catalyst system, the catalyst system comprising chromium oxide, an alkyl silanol compound, an organoaluminum compound, at least a second chromium-based catalyst wherein the second chromium-based catalyst is a chromium oxide on silica or an organoaluminum-reduced chromium oxide on silica, and a silica-containing support comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$; and, controlling one or more of catalyst activity, polymer Mz/Mw, polymer Mw/Mn, and polymer density of the resulting ethylene polymer by varying the level of addition of the alkyl silanol.

In another embodiment, there is an ethylene polymer having a density of 0.918-0.970 g/cm³ and a flow index (I21) of 1-500 and produced by the process comprising the steps of contacting ethylene under polymerization conditions with a catalyst system, said catalyst system comprising chromium oxide, a silica-containing support comprising silica selected from the group consisting of silica having (a) a pore volume of about 1.1-1.8 cm³/g and a surface area of about 245-375 m²/g, (b) a pore volume of about 2.4-3.7 cm³/g and a surface area of about 410-620 m²/g, and (c) a pore volume of about 0.9-1.4 cm³/g and a surface area of about 390-590 m²/g wherein said supported chromium catalyst is activated at 400-860° C.; wherein the chromium oxide catalyst component is treated with an organoaluminum compound after activation and, a second chromium-based compound comprising silylchromate on silica treated with an organoaluminum compound and, controlling one or more of polymer molecular weight, polymer Mz/Mw, polymer Mw/Mn, and distribution of comonomer incorporation by varying the relative amount of each of said chromium oxide and said second chromium-based compound.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 2:
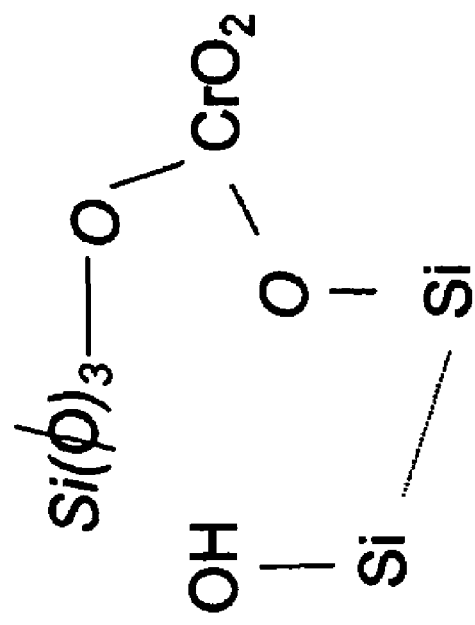
FIG. 2. Possible structure of silylchromate-on-silica catalyst.

As used herein, "a" or "an" is defined herein as one or more.

As used herein, "in situ," in reference to the mode of addition of a component to the catalyst, is defined herein as addition to the catalyst in the reactor. Therefore, when a catalyst component is added in situ, it is added to the remaining catalyst components in the reactor and is not combined with the other catalyst components prior to their transport to the reactor. "In reactor" is synonymous with and used interchangeably herein with "in situ."

As used herein, "in catalyst" or "on catalyst," in reference to the mode of addition of a component to the catalyst, is defined herein as addition directly to the catalyst prior to introduction of the catalyst to the reactor. Therefore, when a component is added to the catalyst "in catalyst" or "on catalyst," it is added to the other catalyst components prior to the transport of the aggregate to the reactor.

As used herein, the term alkyl aluminum is defined as a compound having the general formula $R_3Al$ wherein R can be any of one to twelve carbon alkyl or aryl groups. The R groups can be the same or different.

As used herein, the term alkyl aluminum alkoxide is defined as a compound having the general formula $R_2$—Al—OR wherein R can be any of one to twelve carbon alkyl groups and OR is a one to twelve carbon alkoxy or phenoxy group. The R groups can be the same or different.

As used herein, the term "alkyl silanol" is defined as a compound having the general formula $R_3$—Si—OH where R can be any of one to twelve carbon alkyl groups or aryl groups. The R groups can be the same or different.

As used herein, "DEALE" means diethyl aluminum ethoxide.

As used herein, "DEALSi" means diethylaluminum triethylsiloxide and is used to represent the reaction product of TEAL and triethylsilanol.

As used herein, "TEAL" means triethyl aluminum.

As used herein, "TES" means triethylsilanol.

As used herein, "TIBA" means tri-isobutyl aluminum.

As used herein, "TPS" means triphenylsilanol.

As used herein, "TTIP" means titanium tetraisopropoxide.

As used herein, "$M_w$" is the weight-average molecular weight.

As used herein, "$M_n$" is the number-average molecular weight.

As used herein, "$M_z$" is the z-average molecular weight.

As used herein, "molecular weight distribution" is equal to $M_w/M_n$.

The invention is applicable to the polymerization of olefins by any suspension, solution, slurry, or gas phase process, using known equipment and reaction conditions, and is not limited to any specific type of polymerization system. Generally, olefin polymerization temperatures range from about 0° C. to about 300° C. at atmospheric, subatmospheric, or superatmospheric pressures. Slurry or solution polymerization systems may utilize subatmospheric or superatmospheric pressures and temperatures in the range of about 40° C. to about 300° C. A useful liquid phase polymerization system is described in U.S. Pat. No. 3,324,095. Liquid phase polymerization systems generally comprise a reactor to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isobutane, isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

The invention is, however, especially useful with gas phase polymerization systems, with superatmospheric pressures in the range of 1 to 1000 psi, preferably 50 to 400 psi, most preferably 100 to 300 psi, and temperatures in the range of 30 to 130° C., preferably 65 to 110° C. Stirred or fluidized bed gas phase polymerization systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally partially or fully condensed, and recycled into the reactor. Product is withdrawn from the reactor and make-up monomer is added to the recycle stream. As desired for temperature control of the polymerization system, any gas inert to the catalyst composition and reactants may also be present in the gas stream. In addition, a fluidization aid such as carbon black, silica, clay, or talc may be used, as disclosed in U.S. Pat. No. 4,994,534.

The polymerization system may comprise a single reactor or two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls.

Conventional adjuvants may be used in the process, provided they do not interfere with the operation of the catalyst composition in forming the desired polyolefin. Hydrogen may be used as a chain transfer agent in the process, in amounts up to about 10 moles of hydrogen per mole of total monomer feed.

Polyolefins that may be produced according to the invention include, but are not limited to, those made from olefin monomers such as ethylene and linear or branched higher alpha-olefin monomers containing 3 to about 20 carbon atoms. Homopolymers or interpolymers of ethylene and such higher alpha-olefin monomers, with densities ranging from about 0.86 to about 0.97 may be made. Suitable higher alpha-olefin monomers include, for example, propylene, 1-butene, 1-pentene, 1-hexene, 4-methyl-1-pentene, 1-octene, and 3,5,5-trimethyl-1-hexene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclohexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific polyolefins that may be made according to the invention include, for example, high density polyethylene, medium density polyethylene (including ethylene-butene copolymers and ethylene-hexene copolymers)homo-polyethylene, polypropylene, ethylene/propylene rubbers (EPR's), ethylene/propylene/diene terpolymers (EPDM's), polybutadiene, polyisoprene and the like.

Reduced chromium oxide-on-silica catalysts represent one pathway to improved catalyst systems for polyethylenes having characteristics of those typically formed using silylchromate-on-silica catalysts. It is desired that any such catalytic system exhibit good space-time yield, producing the greatest amount of polyethylene possible with high catalyst activity. Chromium oxide catalysts possess adequate productivity and activity, yet polyethylenes produced through their use are less than optimal for a number of applications where high molecular weight, broad molecular weight distribution, and the presence of some degree of bimodality of molecular weight distribution are desired.

Figure 1:
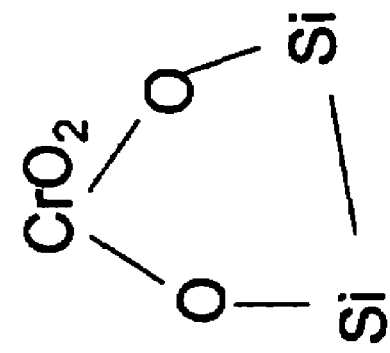
FIG. 1. Possible structure of chromium oxide-on-silica ("Phillips") catalyst.

The so-called Phillips catalyst, introduced in the early 1960s was the first chromium oxide-on-silica catalyst. The catalyst is formed by impregnating a $Cr^{+3}$ species into silica, followed by fluidization of the silica matrix at ca. 400° C.-800° C. Under these conditions, $Cr^{+3}$ is converted to $Cr^{+6}$. The Phillips catalyst is also commonly referred to in the prior art as "inorganic oxide-supported Cr(+6)." While chromium oxide-on-silica catalysts exhibit good productivity, they produce polyethylenes having high molecular weight and narrow molecular weight distribution. The so-called Phillips catalyst and related catalysts are herein referred to as "Oxo-type" catalysts. FIG. 1 gives a schematic representation of the structure of Oxo-type catalysts. Silylchromate-on-silica catalysts are one type of inorganic oxide-supported Cr(+6) catalyst that produces polyethylenes not having the aforementioned deficiencies. Silylchromate-on-silica catalysts are referred to herein as S-type catalysts. FIG. 2 gives a schematic representation of the structure of S-type catalysts. It is and has been a goal to preserve or improve productivity of Oxo-type catalysts, while producing a polyethylene with molecular weight and molecular weight distributions more closely approaching those produced with S-type catalysts.

Variations on catalysts employing $Cr^{+6}$ species supported on silica have been known. One particular variation uses titanium tetraisopropoxide (TTIP) impregnated onto silica along with the $Cr^{+3}$ species. Such modifications result in polyethylenes with slightly greater molecular weight distributions. While this system produces polyethylenes tending towards those produced using silylchromate-on-silica type catalysts, further improvements in molecular weight and molecular weight distribution more closely approaching those obtained with silylchromate-on-silica are desired.

Chromium oxide based catalysts have high activity with moderate induction times. These catalysts make polymer with intermediate molecular weight distribution. The inventors have found that the addition of various silanols, in particular, triphenylsilanol, modifies the molecular weight distribution of polymers produced with CrOx based catalysts. Polymer molecular weight distribution broadens with the formation of a high molecular weight shoulder as determined by size exclusion chromatography (SEC). The resulting polymer looks similar to a polymer obtained with silylchromate-based catalysts.

High catalyst activity and broad polymer molecular weight distribution are desired objectives for High Space-Time Yield (HSTY) operation. As such, there is a need to produce polymers with characteristics of those produced using silylchromate catalysts, but with higher catalyst activities than those obtained using silylchromate, while maintaining the polymer molecular weight and performance properties of silylchromate-produced polymers.

Additionally, the use of silanols with chromium oxide catalysts are useful to tuning catalyst activity, polymer molecular weight and the breadth of the polymer molecular weight distribution by varying the amount of silanol added. Silanol can be used with chromium oxide catalysts in conjunction with a co-catalyst such as TEAL or DEALE. The reagents can be added during a catalyst preparation step ("in catalyst") or by addition to the reactor separately from the catalyst ("in situ"). The silanols of the present invention can also be used as a replacement for silylchromate-based catalyst production. Silanols such as triphenylsilanol (TPS) added to chromium oxide-based catalyst can make similar catalyst as that made with silylchromate on silica. One advantage of the instant approach is a realization of a reduction of catalyst manufacturing costs.

It has also been found that broad molecular weight distribution polyethylenes can be made in which the comonomer can be incorporated into the high molecular weight component by using two chromium catalysts. Broad or bimodal molecular weight distribution polyethylene is especially useful for high environmental stress crack resistant (ESCR) applications such as large part blow molding, or pipe. It has been observed that some chromium oxide catalysts or chromium oxide catalysts reduced with aluminum alkyls, such as TEAL, are capable of very high molecular weight polyethylene with significant comonomer incorporated. When combined with a chromium catalyst that makes a lower molecular weight polymer with little comonomer incorporation under similar conditions, (e.g., silylchromate) or a chromium oxide catalyst treated with DEALE or with a silanol such as TPS plus DEALE, the desired polymer can be produced.

Chromium oxide catalysts activated at 600-825° C. with loadings of 0.25-0.5 wt. % chromium on Davison 955 silica followed by reduction with TEAL are particularly useful to make the high molecular weight component (this catalyst component can also be treated with a silanol (e.g., TPS) prior to aluminum alkyl (e.g., TEAL) reduction to also obtain a very high molecular weight polymer). This catalyst still incorporates comonomer at a high rate and is capable of making comonomer in situ. The low molecular weight component can be made with a highly reduced silylchromate-type catalyst. However, the inventors have found that very low molecular weight polymer can be made when activated chromium oxide catalyst is treated with TPS and then DEALE. The broad molecular weight distribution can be made by blending the polymer components made individually by each catalyst system or by first blending the catalysts and then making the mixed polymers during the polymerization reaction. The inventors have found that a very broad molecular weight distribution can be obtained without an excessive increase in the z-average molecular weight ($M_z$) component. This is particularly important to allow for high ESCR without a significant increase in polymer swell.

While in many of the examples that follow, DEALE is used, other aluminum alkyls may be used. Similarly, where DEALE is used, it should be understood that other alkyl aluminum alkoxides may be used and where TPS is used, other silanols may be substituted. In general, the alkyl groups of the aluminum alkyl can be the same or different, and should have from about 1 to about 12 carbon atoms and preferably 2 to 4 carbon atoms. Examples include, but are not limited to, triethylaluminum, tri-isopropylaluminum, tri-isobutyl aluminum, tri-n-hexyl aluminum, methyl diethylaluminum, and trimethylaluminum. Although the examples focus primarily on the use of TEAL, it should be understood that the invention is not so limited. In general, the alkyl aluminum alkoxide, having the general formula $R_2$—Al—OR where the alkyl groups may be the same or different, should have from about 1 to about 12 carbon atoms and preferably 2 to 4 carbon atoms. Examples include but are not limited to, diethyl aluminum ethoxide, diethyl aluminum methoxide, dimethyl aluminum ethoxide, di-isopropyl aluminum ethoxide, diethyl aluminum propoxide, di-isobutyl aluminum ethoxide, and methyl ethyl aluminum ethoxide. Although the examples almost exclusively use DEALE, it should be understood that the invention is not so limited. Additionally with respect to the silanols useful in the present invention, a number of silanols may be used. These include triphenyl silanol, methyl diphenyl silanol, trimethyl silanol, triethyl silanol, triisobutyul silanol, as well as others.

Table 1 lists several exemplary commercial silica supports with their physical properties. These silica supports are illustrative examples and not exhaustive of the types of silica which may be used in the present invention. Other silica supports commonly used in the field and known to those of skill in the art are also useful herein. Table 1 provides approximate pore volume, surface area, average pore diameter, average pore size and percent titanium for the silica supports used in this study. The label is that used by the supplier to describe the support. The number without the parentheses is the name of the support supplied as silica alone. The number in parentheses is the name of the support when it is supplied with a chromium salt already impregnated on the support. Although these silicas were obtained from the suppliers any silica fitting the specifications below would be expected to function in a similar manner. The present invention is not limited to any specific commercial silica support but may be used with any silicas having a pore volume of about 1.1-1.8 $cm^3/g$ and a surface area of about 245-375 $m^2/g$; or a pore volume of about 2.4-3.7 $cm^3/g$ and a surface area of about 410-620 $m^2/g$; or a pore volume of about 0.9-1.4 $cm^3/g$ and a surface area of about 390-590 $m^2/g$.

TABLE 1

Commercial Silica Supports and Physical Properties

| Silica Support | Pore Volume ($cm^3/g$) | Surface Area ($m^2/g$) | Average Pore Diameter (Å) | Average Pore Size (μm) | Ti (%) |
|---|---|---|---|---|---|
| Grace 955 (957) | 1.45 | 310 | 210 | 55 | — |
| PQ MS3050 (35100) | 3.02 | 513 | 198 | 90 | — |
| Ineos EP52 (352) | 1.15 | 490 | 90 | 70 | 2.60 |

General Catalyst Preparations

Unless otherwise noted the catalysts used in the following examples were all made by the following procedures.

General Preparation A. Chromium oxide catalyst activation: Catalysts were received from the suppliers with the chromium already impregnated on the supports. The catalyst physical properties are described in Table 1. Activation is conducted by passing gas through the catalyst for four hours at the specified temperature in dry air. This is usually conducted in a tube furnace. The catalyst is then stored under nitrogen until used.

General Preparation B Chromium oxide catalyst treatment: In a typical preparation 3 grams of previously activated catalyst is placed in a 50 mL airless ware flask with a stir bar under inert atmosphere. Thirty-five mL of dry degassed hexane is added and the mixture is heated to 50° C. The silanol is then added via syringe. The mixture is stirred 2 hours followed by alkylaluminum addition, when used (all reagents are 20-25 wt. % in hexane). The stated equivalents are always the ratio of reagent to chromium. After 30 minutes, drying is commenced. This can be done under high vacuum or with a nitrogen purge. Catalyst is stored under nitrogen until used.

Catalyst Descriptions

When used, the ratio of reagents to chromium added can be found in the example; "in reactor" means the catalyst was added separately from the catalyst. "On catalyst" means the reagent is added in a catalyst preparation step.

EXAMPLE 1

The catalyst was used as supplied by Davison Chemical and consists of 0.5 wt. % chromium on Davison 955 silica and was activated at 825° C. (General preparation A). See silica specifications in Table 1.

EXAMPLES 2-3

The catalyst is the same as that used in Example 1 except that TPS is added in a catalyst preparation step as in General preparation B.

EXAMPLES 4-6

The catalysts are the same as examples 1-3 except the silica contained only 0.25 wt. % chromium and was activated at 600° C.

EXAMPLES 7-8

The catalyst is the same as that used in example 1 except the catalyst was activated at 600° C.

EXAMPLES 9-10

The catalyst consists of 0.5 wt. % Cr on Davison 955 silica (200° C. dehydration) treated with titanium tetraisopropoxide prior to activation. Enough TTIP is added so after activation 3.8 wt. % Ti remains (see U.S. Pat. No. 4,011,382 for specific procedures for TTIP addition). Activation was done at 825° C. TPS was added in reactor.

EXAMPLES 11-12

Same catalyst as that used in example 9.

EXAMPLES 13-16

Same catalyst as that used in example 1. When used on catalyst TPS and DEALE are added as in General prep B.

EXAMPLES 17-18

The catalyst is the same as that used in example 7.

EXAMPLE 19-22

The catalyst is the same as that used in example 4. When used on catalyst, TPS and DEALE are added as in General prep B.

EXAMPLES 23-24

The catalyst is the same as that used in example 9.

EXAMPLE 25

The catalyst is the same as that used in example 1 treated with TPS and triisobutyl aluminum (TIBA) as in General prep B.

EXAMPLES 26-29

The catalyst is the same as that used in example 1. When used, DEALSi is added to the reactor separately. DEALSi is formed by mixing in hexane equal molar amounts of triethylsilanol and triethylaluminum

EXAMPLES 30-32

The catalyst is the same as that used in example 9. When used, DEALSi is added to the reactor separately.

EXAMPLES 33-35

The catalyst used is MS35100 which is a chromium oxide catalyst on MS 3050 silica obtained from PQ with the specifications listed in Table 1. The catalyst contains 0.5 wt. % Cr. The catalyst is activated at 700° C. (General preparation A). When used on catalyst, TPS and DEALE are added as in General prep B.

EXAMPLE 36

The catalyst is the same as that used in example 4 treated with 2 equivalents of TEAL as in General prep B.

EXAMPLE 37

The catalyst is the same as that used in example 7 treated with TPS and DEALE as in General prep. B.

EXAMPLE 38

Equal weight amounts of the catalysts from examples 36 and 37 are used here.

EXAMPLE 39

Catalyst preparation: 3.59 grams of previously dehydrated 955 silica is placed in a 50 mL airless ware flask with a stir bar under inert atmosphere. Next 0.112 grams of bis-triphenylsilyl chromate is added. Thirty-five mL of dry degassed hexane is added and the mixture is heated to 50° C. The mixture is stirred for 2 hours, then 10 equivalents of DEALE is added. After 30 minutes at 50° C., the mixture is dried under high vacuum.

Lab Slurry Procedure

A one liter stirred reactor was used for the polymerization reactions. The reactor was thoroughly dried under a purge of nitrogen at elevated temperatures before each run. 500 mL of dry degassed hexane was fed to the reactor at 60° C. If used, hexene is added at this point. Unless otherwise noted 10 mL of 1-hexene is used in each experiment. A small quantity (0.1-0.25 g) of Davison 955 silica dehydrated at 600° C. and treated with 0.6 mmole/g of TEAL is then added to the reactor to passivate any impurities. No TEAL treated silica was added in any run where a reagent was added to the reactor separately from the catalyst. After stirring for 15 minutes the catalyst is charged followed by additional reagents. When silanols and alkylaluminum reagents are added separately to the reactor from the catalyst, the silanol is added first followed by the addition of the alkyaluminum. Both are added as dilute hexane solutions. The reactor is sealed and hydrogen is charged at this point. Hydrogen is only used where noted in the tables. The reactor is charged to 200 psi with ethylene. Ethylene is allowed to flow to maintain the reactor pressure at 200 psi. Ethylene uptake is measure with an electronic flow meter. All copolymerizations were run at 85° C. Polymerizations were run until a maximum of 160 grams polyethylene were made or terminated sooner. The reactor was opened after depressurization and the temperature lowered. The polymer weight was determined after allowing the diluent to evaporate. The polymer was then characterized employing a number of tests.

Tests

Density: ASTM D-1505.

Melt Index: ($I_2$) ASTM D-2338 Condition E measured at 190° C. reported as grams per 10 minutes.

Flow Index: ($I_{21}$) ASTM D-1238 Condition F measured at 190° C. using 10 times the weight as used in Melt Index above.

MFR: Melt Flow ratio is the Flow index/Melt index.

SEC: Polymer Laboratories instrument; Model: HT-GPC-220, Columns: Shodex, Run Temp: 140° C., Calibration Standard: traceable to NIST, Solvent: 1,2,4-Trichlorobenzene. Mn and Mw values in the tables should be multiplied by $10^3$. Mz values multiplied by $10^6$.

BBF: Butyl branching frequency as measured by $^{13}$C-NMR. The value is the number of butyl branches per 1000 carbon atoms.

Figure 3:
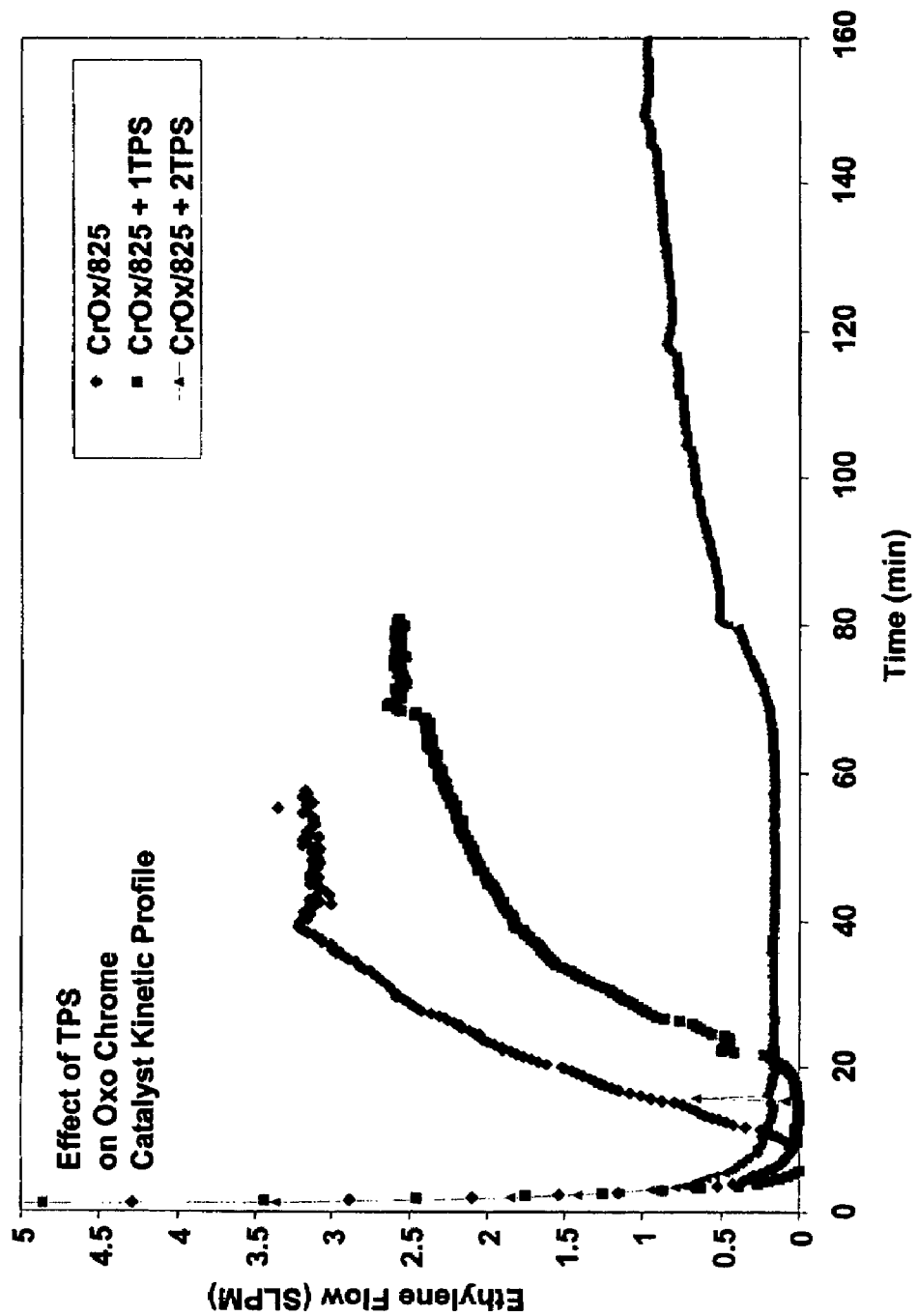
FIG. 3. Effect of TPS on CrOx catalysts kinetic profile.

Effect of Silanol on CrOx Catalyst: Molecular Weight Distribution, Molecular Weight, and Productivity The effect of adding arylsilanol to chromium oxide catalyst systems was studied using chromium oxide (0.5 wt. %) loaded onto 955-type silica activated at 825° C. (see Table 2, examples 1-3), having a pore volume of about 1.1-1.8 cm$^3$/g and a surface area of about 245-375 m$^2$/g. TPS was used as the arylsilanol in this example. A clear trend in broadening molecular weight distribution (Mw/Mn) is seen when 2 equivalents of TPS are added, relative to that seen for 1 equivalent of TPS and in the absence of TPS. An increase in $M_z/M_w$ indicates the growth of a high molecular weight shoulder as TPS is added. Polymer density was observed to increase when TPS was added indicating lower comonomer incorporation. Desired densities of about 0.918-0.970 g/cm$^3$, among others, of the resulting polymers may be so obtained. BBF measurements confirm lower comonomer incorporation (see Table 2). Polymer molecular weight also increases. Catalyst activity is found to decrease as the amount of TPS is increased. Lower catalyst activity is due to a combination of longer induction times and lower inherent activity (FIG. 3).

TABLE 2

Effect of Triphenyl Silanol (TPS) on Oxo Chromium Catalyst

| Examples | TPS added to catalyst | Time (min) | YIELD (g) | Flow Index | Act.gPE/ gcat-1 hr | Bulk Density (g/cc) | Mn | Mw | Mz | Mw/Mn | Mz/Mw | BBF |
|---|---|---|---|---|---|---|---|---|---|---|---|---|
| | CrOx on 955 Silica/0.5 wt % Cr; 825 C. activation | | | | | | | | | | | |
| 1 | none | 58 | 153 | 2.6 | 1,429 | 0.34 | 25.1 | 243 | 1.09 | 9.68 | 4.47 | 3.7 |
| 2 | 1 eq. | 80 | 161 | 2.1 | 607 | 0.42 | 21.4 | 283 | 1.46 | 13.26 | 5.17 | 2.9 |
| 3 | 2 eq. | 160 | 101 | 2.6 | 102 | 0.35 | 10.3 | 348 | 2.16 | 33.90 | 6.22 | 1.9 |

Figure 4:
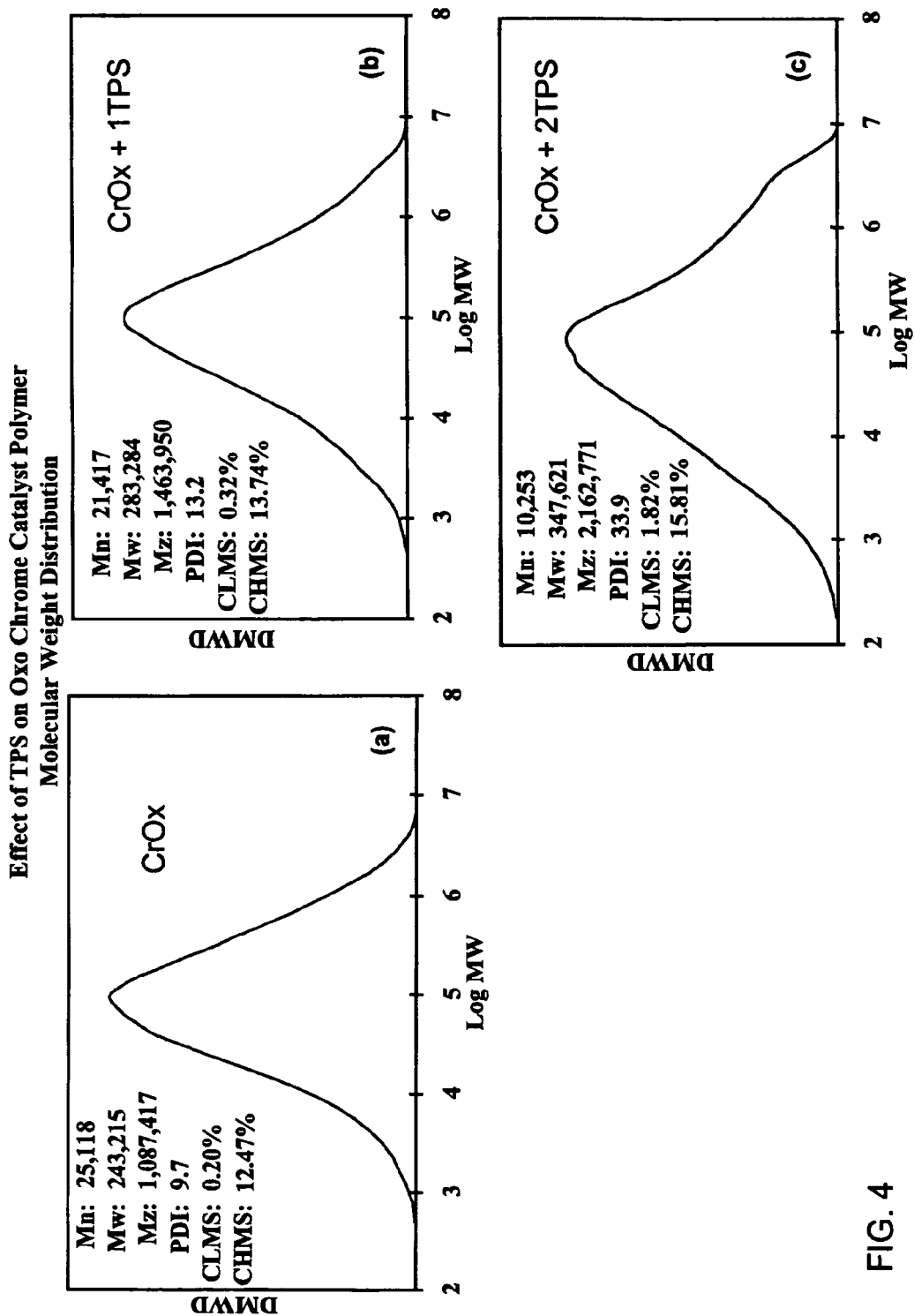
FIG. 4. Effect of TPS on CrOx catalyst polymer molecular weight distribution.

FIG. 4 illustrates the molecular weight plots (data obtained by SEC) for polymers made with CrOx with no TPS (FIG. 4a); CrOx with 1 equivalent of TPS (FIG. 4b); and CrOx with 2 equivalents of TPS (FIG. 4c) (examples 1-30). The high molecular weight shoulder becomes pronounced for polymer produced with CrOx catalyst in the presence of 2 equivalents of TPS. Although not readily apparent from the figures, the high molecular weight shoulder also increases in magnitude in going from polymer produced in the absence of TPS to that produced in the presence of 1 equivalent of TPS. This trend is evidenced by the increase in $M_z/M_w$ values of 4.47 and 5.17, respectively for polymer produced with CrOx in the absence of TPS and that produced with CrOx in the presence of 1 equivalent of TPS. Polymer MWD can be varied by controlling the amount of arylsilanol added to the catalyst.

TABLE 3

Effect of Triphenyl Silanol (TPS) on Oxo Chromium Catalyst

| Examples | Catalyst and TPS addition method | Time (min) | YIELD (g) | FI | Act.gPE/ gcat-1 hr | BD | Mn | Mw | Mz | Mw/Mn | Mz/Mw | Den. g/cc |
|---|---|---|---|---|---|---|---|---|---|---|---|---|
| | CrOx on 955 Silica/0.25 wt % Cr; 600 C. activation | | | | | | | | | | | |
| 4* | no TPS | 72 | 174 | 1.1 | 765 | 0.28 | 18.1 | 356 | 1.79 | 20 | 5.0 | 0.9360 |
| 5 | 1 eq. TPS on catalyst | 118 | 143 | 1.1 | 274 | 0.35 | 15.6 | 409 | 1.92 | 26 | 4.7 | 0.9423 |
| 6 | 2 eq. TPS on catalyst | 300 | 78 | 3.8 | 30 | 0.26 | 11.6 | 327 | 1.68 | 28 | 5.1 | 0.9447 |
| | CrOx on 955 Silica/0.50 wt % Cr; 600 C. activation | | | | | | | | | | | |
| 7 | no TPS | 110 | 154 | 5.6 | 1,074 | 0.32 | 14.9 | 294 | 1.54 | 20 | 5.2 | 0.9402 |
| 8 | 1 eq. TPS in reactor | 94 | 179 | 1.0 | 472 | 0.32 | 15.6 | 368 | 1.71 | 24 | 4.7 | 0.9407 |
| | TiCrOx on 955 Silica/0.5 wt % Cr; 825 C. activation | | | | | | | | | | | |
| 9 | no TPS | 62 | 156 | 3.8 | 1,497 | 0.32 | 12.6 | 212 | 0.88 | 17 | 4.2 | 0.9466 |
| 10 | 1 eq. TPS in reactor | 65 | 161 | 6.1 | 612 | 0.29 | 10.1 | 234 | 1.27 | 23 | 5.4 | 0.9470 |

[*20 ml 1-hexene used here]

Figure 5A:
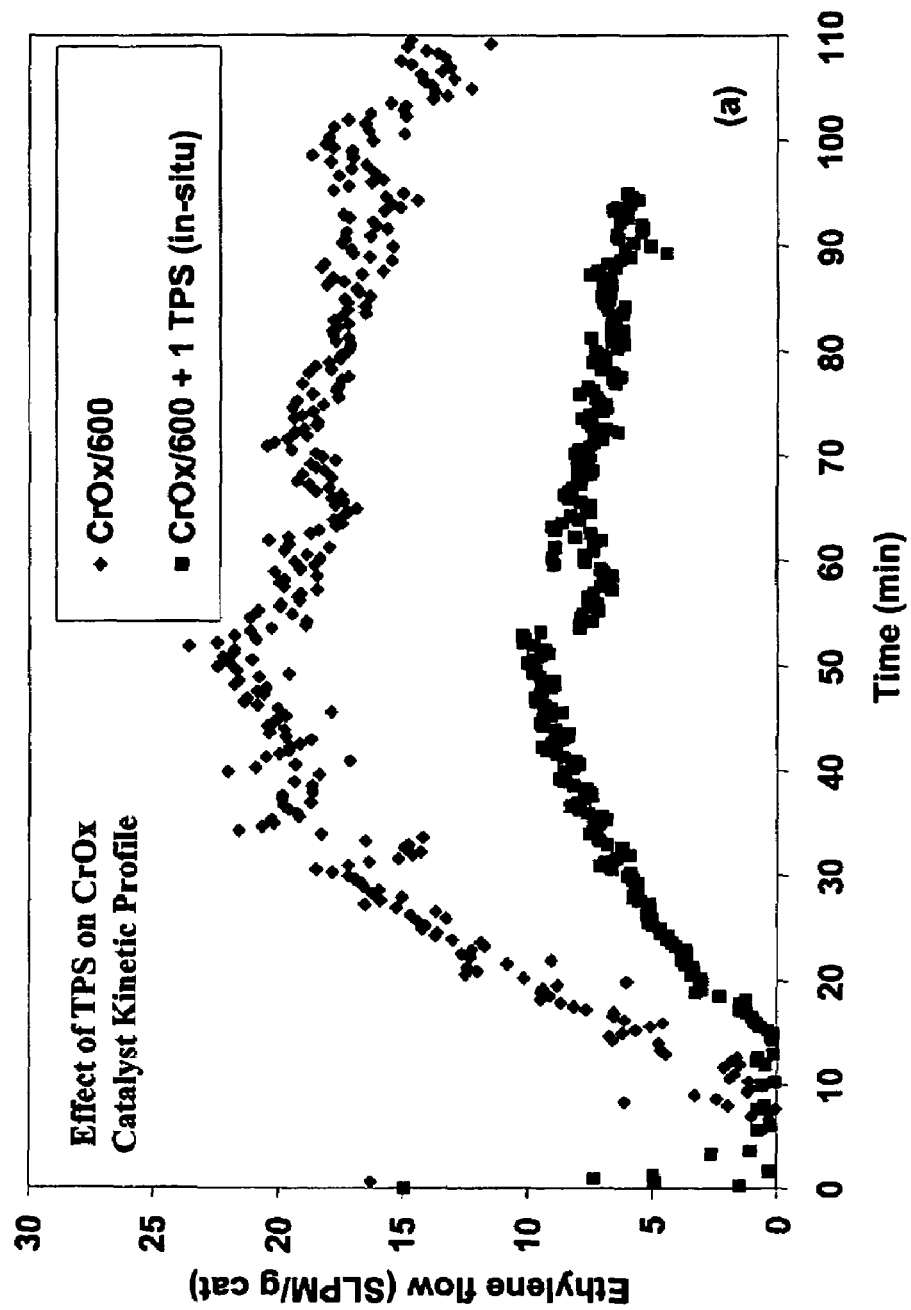
FIG. 5. Effect of TPS on CrOx catalyst kinetic profile; 5A, CrOx; 5B, Ti—CrOx.
Figure 5B:
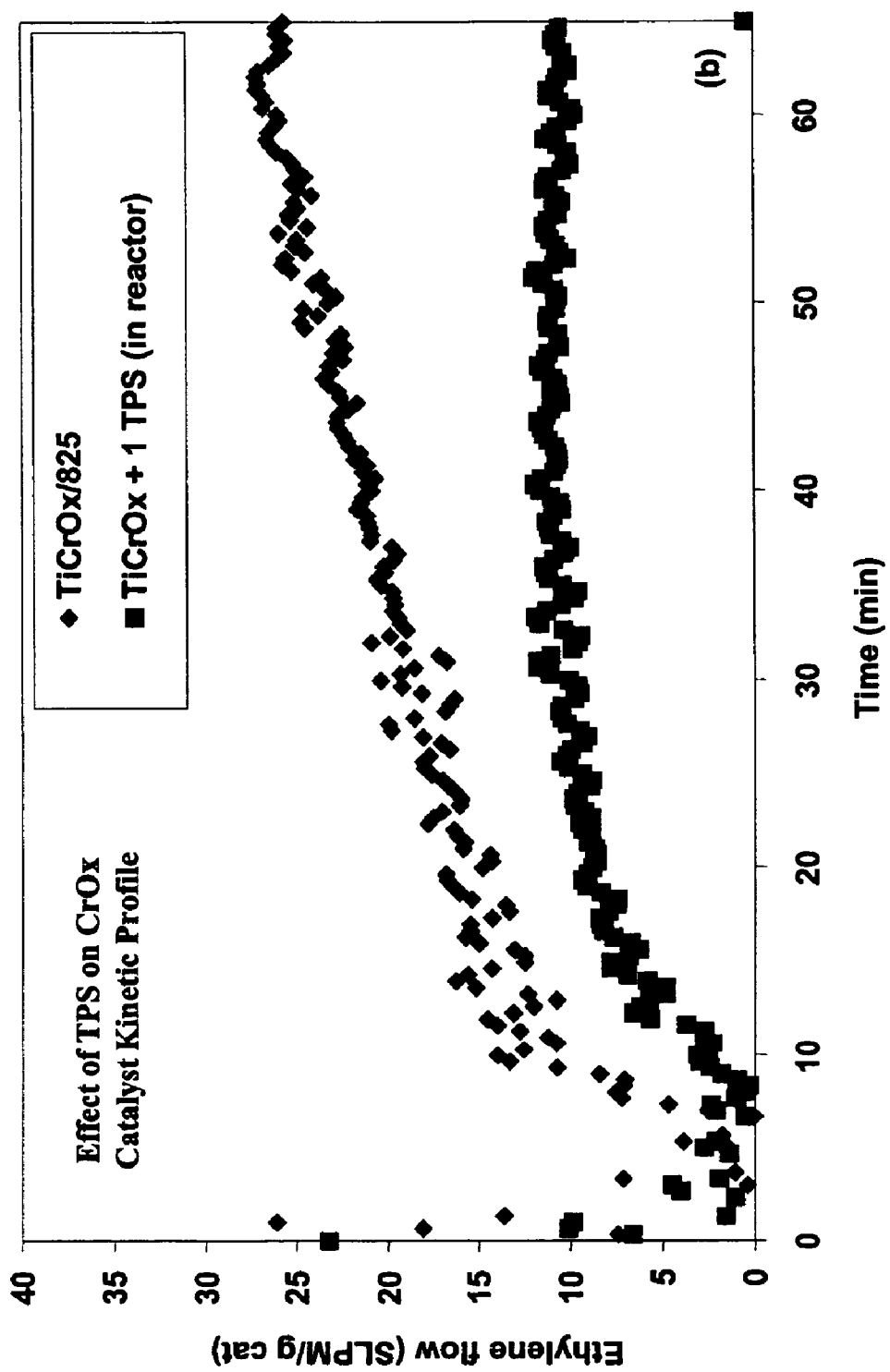

In Table 3 (examples 4-6), data is presented for CrOx on 955-type silica at a loading of 0.25 wt. % chromium and activated at 600° C. in the absence of TPS; in the presence of 1 equivalent of TPS; and in the presence of 2 equivalents of TPS. Also shown is data for CrOx on 955-type silica at a loading of 0.5 wt. % chromium and activated at 600° C. in the absence of TPS and in the presence of 1 equivalent of TPS added in situ. Finally, there is data for titanated chromium oxide on 955-type silica activated at 825° C. in the absence of TPS and with 1 equivalent of TPS added in situ. The effect of TPS is apparent. Molecular weight distribution broadens but without a significant increase in the high molecular weight tail. In examples 4-10 the catalyst induction periods were observed to increase when TPS is added (FIG. 5). FIG. 5(a) shows chromium oxide on 955-type silica activated at 600° C.; FIG. 5(b) shows titanated chromium oxide on 955-type silica activated at 825° C.

In comparison with the above-presented data, it can be seen that the molecular weight effects are catalyst-specific. In the present example, molecular weight distribution is broadened, but the high molecular weight shoulder was not enhanced; in the earlier example, the addition of TPS both broadened the molecular weight distribution and increased the intensity of the high molecular weight shoulder.

Figure 6:
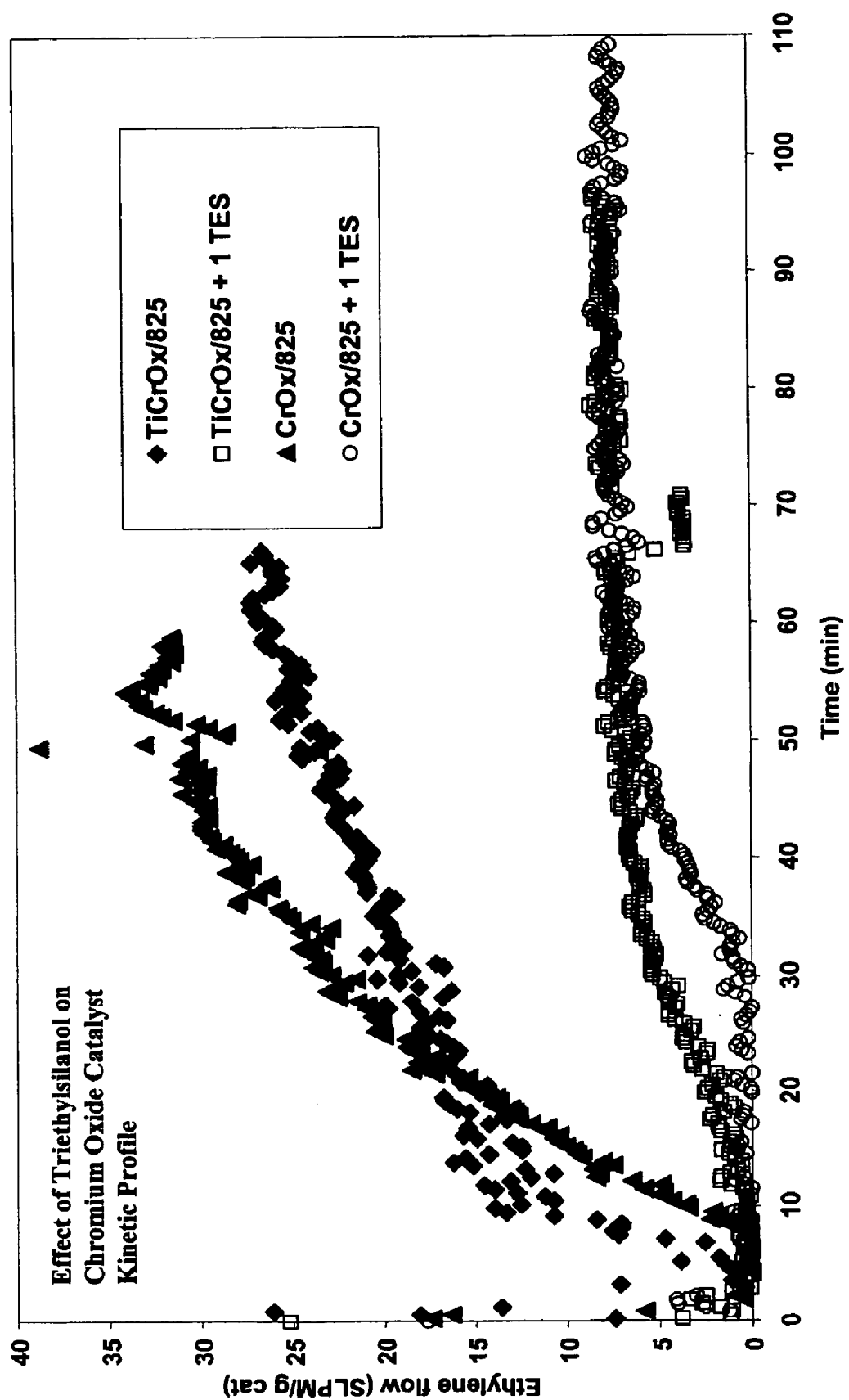
FIG. 6. Effect of TES on CrOx catalyst kinetic profile.

In Table 4 (examples 11-14), data is presented for triethylsilanol (TES) addition to chromium oxide catalysts in ethylene polymerization reactions. Separate addition of TES to polymerization reactions catalyzed with titanated chromium oxide on 955 type silica and chromium oxide on 955 type silica, both with 0.5 wt. % chromium and activated at 825C, led to much reduced activity and little or no change in polymer molecular weight distribution. In FIG. 6 it can be seen that TES addition leads to longer induction periods and lower activity levels. This shows that not only is this technology catalyst specific, it is also silanol specific.

TABLE 4

Addition of TES to Chromium Oxo Catalysts

| Examples | Catalyst and TEX addition method | Time (min) | YIELD (g) | FI | Act.gPE/ gcat-1 hr | Act.gPE/ gcat-1 hr | Mn (×10³) | Mw (×10³) | Mz (×10⁶) | Mw/Mn | Mz/Mw | Den. g/cc |
|---|---|---|---|---|---|---|---|---|---|---|---|---|
| | TiCrOx on 955 Silica/0.5 wt % Cr; 825 C. activation | | | | | | | | | | | |
| 11 | no TES | 67 | 165 | 12.2 | 1,309 | 0.23 | 9.4 | 170 | 0.75 | 18 | 4.4 | 0.9403 |
| 12 | 1 eq. TES in reactor | 97 | 162 | 7.7 | 386 | 0.27 | 12.7 | 231 | 1.27 | 18 | 5.5 | 0.9469 |

TABLE 4-continued

Addition of TES to Chromium Oxo Catalysts

| Examples | Catalyst and TEX addition method | Time (min) | YIELD (g) | FI | Act.gPE/ gcat-1 hr | Act.gPE/ gcat-1 hr | Mn (×10³) | Mw (×10³) | Mz (×10⁶) | Mw/Mn | Mz/Mw | Den. g/cc |
|---|---|---|---|---|---|---|---|---|---|---|---|---|
| | CrOx on 955 Silica/0.5 wt % Cr; 825 C. activation | | | | | | | | | | | |
| 13 | no TES | 59 | 101164 | 3.8 | 1,416 | 0.28 | 22.7 | 271 | 1.38 | 12 | 5.1 | 0.9399 |
| 14 | 1 eq. TES in reactor | 110 | 160 | 2.1 | 338 | 0.28 | 22.1 | 302 | 1.52 | 14 | 5.0 | 0.9398 |

Alkyl silanols also provide for useful chemistry when alkyl aluminum alkoxides are used with CrOx-type catalysts. The addition of silanols and alkyl aluminum alkoxides can be used to convert CrOx catalysts and titanated CrOx catalysts into catalyst systems providing performance similar to silylchromate-based catalyst systems. Silylchromate-based catalysts generally produce desirable polyethylenes relative to those produced by chromium oxide-type catalysts. Silylchromate produced polyethylenes generally have a broader molecular weight distribution than those produced using chromium oxide-type catalysts. The broader molecular weight distribution leads to better processability of the resulting polyethylene. However, the productivities of silylchromate-based catalysts are typically much poorer than those realized using chromium oxide-based catalysts.

on 955-type silica. Polymerizations without silanol or any organoaluminum is compared with analogous systems having 5 equivalents of DEALE and 1 equivalent of TPS added to the catalyst. (0.5 wt. % of chromium loading and activated at 825° C.; examples 15 and 16). Significant increase in polymer flow index and polymer molecular weight distribution accompanied by a high molecular weight shoulder (very high Mz/Mw) can be seen. Addition of alkyl aluminum alkoxide and alkyl silanol can be used to control these parameters. Although values outside this range are attainable, desirable flow index values from about 1-500 can be achieved. Catalyst activity is also observed to increase and catalyst induction period normally associated with TPS addition is eliminated. The combination of the TPS and DEALE produce the desired polymer molecular weight

TABLE 5

Effect of TPS and Alkylaluminum Compounds of Chromium Oxo Catalysts

| Examples | Catalyst and modifiers addition method | H2 (scc) | Time (min) | YIELD (g) | FI | Act.gPE/ gcat-1 hr | BD | Mn | Mw | Mz | DI | Z/W | Den. g/cc |
|---|---|---|---|---|---|---|---|---|---|---|---|---|---|
| | CrOx on 955 Silica/0.5 wt % Cr; 825 C. activation | | | | | | | | | | | | |
| 15 | none | 0 | 79 | 174 | 2.4 | 1,250 | 0.32 | 26.4 | 268 | 1.33 | 10.1 | 5.0 | 0.9425 |
| 16 | 1 eq. TPS + 5 eq. DEALE in catalyst | 0 | 49 | 126 | 47.5 | 1,523 | 0.30 | 10.7 | 197 | 2.03 | 18.5 | 10.3 | 0.9622 |
| | CrOx on 955 Silica/0.5 wt % Cr; 600 C. activation | | | | | | | | | | | | |
| 17 | none | 500 | 110 | 154 | 5.6 | 1,074 | 0.32 | 14.9 | 294 | 1.54 | 20.0 | 5.2 | 0.9402 |
| 18 | 1 eq. TPS + 5 eq. DEALE in reactor | 500 | 116 | 120 | 14.8 | 490 | 0.33 | 13.8 | 278 | 1.93 | 20.1 | 6.9 | 0.9583 |
| | CrOx on 955 Silica/0.25 wt % Cr; 600 C. activation | | | | | | | | | | | | |
| 19* | none | 500 | 72 | 174 | 1.1 | 765 | 0.28 | 18.1 | 356 | 1.79 | 19.6 | 5.0 | 0.9360 |
| 20 | 1 eq. TPS + 5 eq. DEALE in reactor | 500 | 71 | 154 | 38.7 | 590 | 0.37 | 8.3 | 192 | 2.00 | 23.2 | 10.4 | 0.9595 |
| 21 | 2 eq. TPS + 5 eq. DEALE in reactor | 500 | 78 | 156 | 29.5 | 309 | 0.41 | 7.8 | 212 | 1.88 | 27.3 | 8.9 | 0.9594 |
| 22 | 1 eq. TPS + 5 eq. DEALE in catalyst | 500 | 34 | 153 | 148.1 | 1,211 | 0.38 | | | | | | |
| | TiCrOx on 955 Silica/0.5 wt % Cr; 825 C. activation | | | | | | | | | | | | |
| 23 | none | 500 | 64 | 175 | 9.7 | 1,380 | 0.32 | 9.8 | 182 | 0.81 | 18.5 | 4.47 | 0.9471 |
| 24 | 1 eq. TPS + 5 eq. DEALE in reactor | 500 | 72 | 176 | 42.2 | 703 | 0.29 | 7.8 | 196 | 1.66 | 25.0 | 8.47 | 0.9599 |
| | CrOx on 955 Silica/0.5 wt % Cr; 825 C. activation | | | | | | | | | | | | |
| 25 | 1 eq. TPS + 5 eq. TIBA in catalyst | 500 | 72 | 145 | 5.4 | 496 | 0.31 | | | | | | 0.9501 |

[*20 ml 1-hexene used here]

Figure 7:
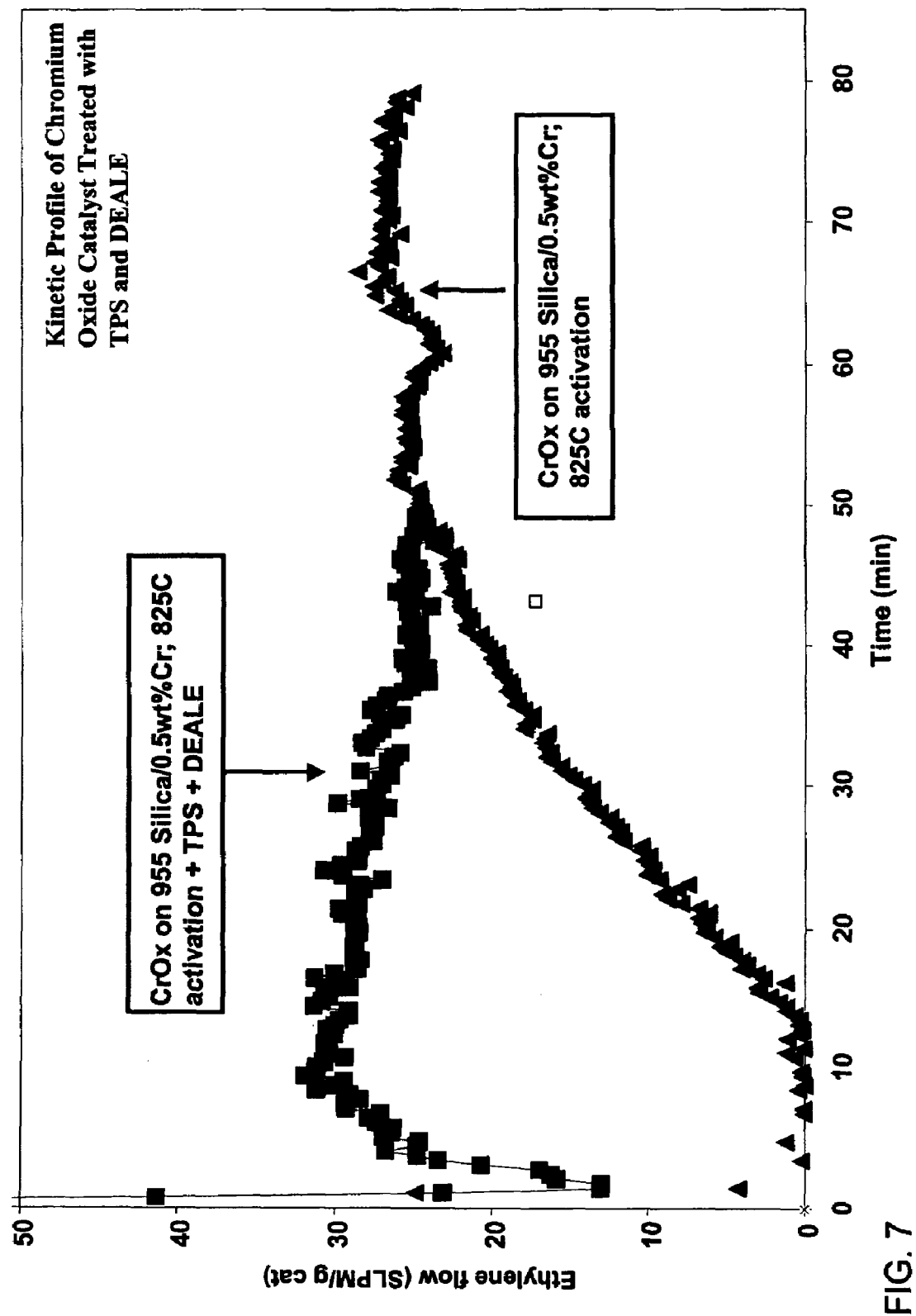
FIG. 7. Kinetic profile of CrOx catalyst treated with TPS and DEALE.

Table 5 illustrates the effect of the addition of silanol and alkyl aluminum alkoxide to chromium oxide-based catalyst distribution while decreasing catalyst induction time compared to that found without DEALE addition (FIG. 7). The same comparison can be seen in Examples 17 and 18 except that the catalyst activation was conducted at 600° C. and the TPS and DEALE were added to the reactor. The polymer molecular weight drops, the molecular weight distribution remains the same but the high molecular weight shoulder is seen to increase. In examples 19 to 22, the same catalyst is used as in the previous examples except that the chromium loading is 0.25 wt. %. When TPS and DEALE are added to the reactor (examples 20 and 21), the polymer molecular weight is observed to decrease, molecular weight distribution increases and the high molecular weight shoulder increases (higher Mz/Mw) compared to the unmodified catalyst. When the components were added to the catalyst (example 22), higher catalyst activity and polymer flow index values were found. Utility lies in the ability to control these parameters, allowing one a greater ability to tailor the characteristics of the polymer produced.

In Example 24 separate addition of TPS and DEALE to a polymerization reaction using titanated chromium oxide catalyst (0.5 wt. % Cr) on 955 type silica activated at 825° C. was conducted. In comparison to the same reaction without TPS and DEALE (example 23), polymer molecular flow index is observed to increase, molecular distribution increases and the high molecular weight shoulder increases (higher Mz/Mw).

alone. Polymer molecular weights are too high for most product applications in the absence of alkyl aluminum and alkyl aluminum alkoxides.

Figure 8:
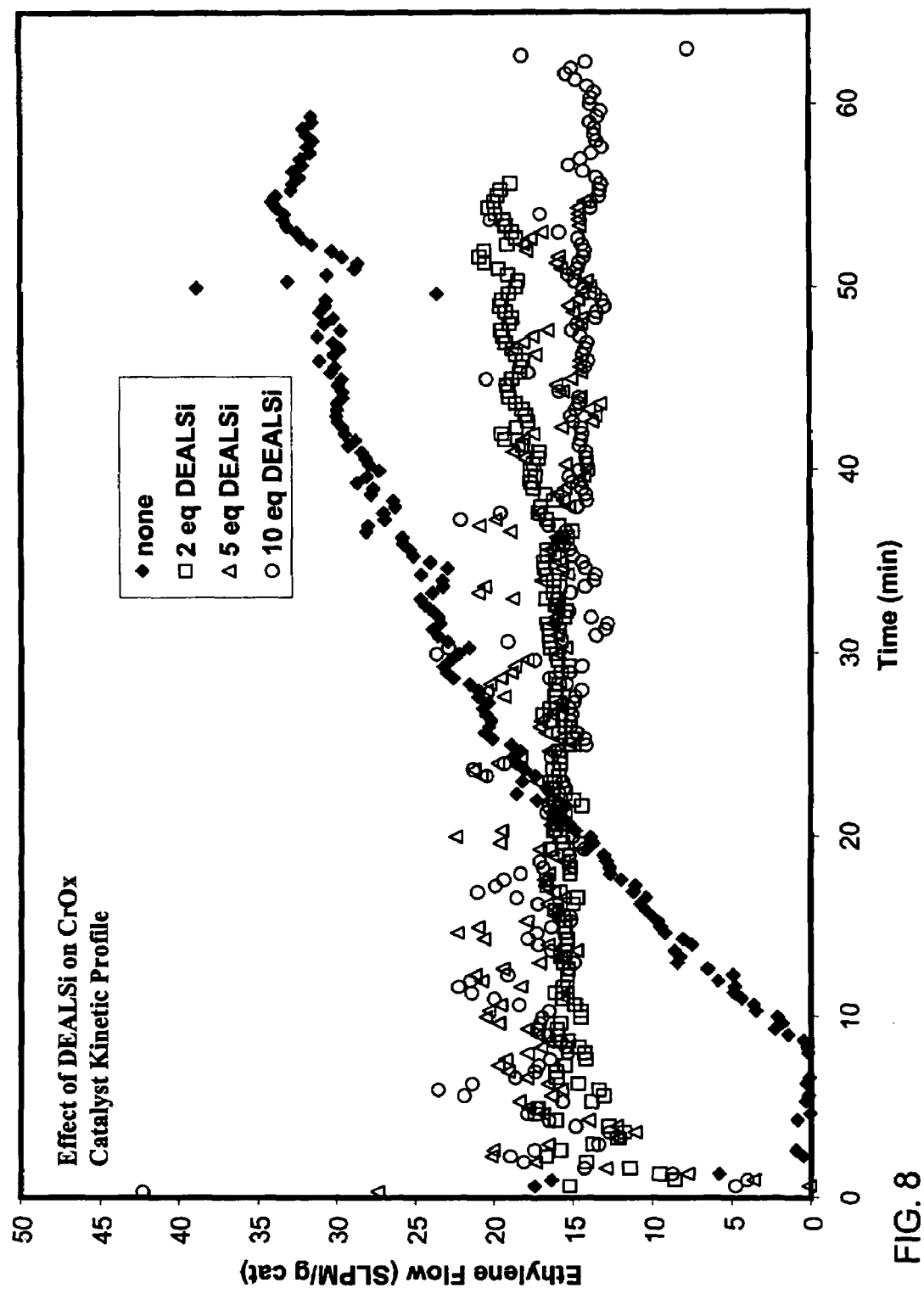
FIG. 8. Effect of DEALSi on CrOx catalyst kinetic profile.

The addition of diethylaluminum triethylsiloxide (DEALSi) to chromium oxide or titanated chromium oxide catalyst yields results similar to those obtained using silyl-chromate-based catalysts. Generally, higher productivities for the catalysts, and higher molecular weights for the resulting polyethylenes are obtained when using chromium oxide or titanated chromium oxide catalyst in the presence of DEALSi. DEALSi is the reaction product of one equivalent each of triethyl silanol and triethyl aluminum. As DEALSi is added spanning the range of 2 to 5 and 10 equivalents, an increase in polymer flow index is observed. (Table 6, examples 26 through 32). Induction time is altered and the kinetic profile shows an elimination of induction time in the presence of DEALSi (see FIG. 8). Additionally, the data in Table 6 shows that polyethylenes having broader molecular weight distribution and a more pronounced high molecular weight shoulder result from the introduction of DEALSi into chromium oxide-based catalyst systems. Addition of TES alone to chrome oxide catalysts as shown in Table 4 did not modify polymer properties and significantly poisoned the catalysts. The reaction product of TEAL and TES in conjunction with specific catalysts allows for high catalyst activities, improved flow index response and polymer molecular weight distribution.

TABLE 6

Effect of DEALSi on Chromium Oxo Catalysts

| Examples | DEALSi in situ addition | Time (min) | YIELD (g) | Flow Index | Act.gPE/gcat-1 hr | BD | Mn | Mw | Mz | DI | Z/W | Den. g/cc |
|---|---|---|---|---|---|---|---|---|---|---|---|---|
| CrOx on 955 Silica/0.5 wt % Cr; 825 C. activation |
| 26 | none | 59 | 164 | 3.8 | 1,416 | 0.28 | 22.7 | 271 | 1.38 | 12.0 | 5.07 | 0.9399 |
| 27 | 2 eq. | 56 | 151 | 29.9 | 1,101 | 0.33 | | | | | | 0.9554 |
| 28 | 5 eq. | 55 | 147 | 34.4 | 1,027 | 0.35 | 10.7 | 160 | 1.46 | 15.0 | 9.13 | 0.9540 |
| 29 | 10 eq. | 63 | 141 | 42.3 | 975 | 0.33 | | | | | | 0.9562 |
| TiCrOx on 955 Silica/0.5 wt % Cr; 825 C. activation |
| 30* | none | 67 | 165 | 12.2 | 1,309 | 0.23 | 9.4 | 170 | 0.75 | 18.0 | 4.42 | 0.9403 |
| 31 | 2 eq. | 80 | 169 | 34.4 | 838 | 0.35 | | | | | | 0.9558 |
| 32 | 5 eq. | 68 | 143 | 21.5 | 814 | 0.32 | 8.5 | 170 | 1.38 | 20.1 | 8.08 | 0.9564 |

[*20 ml 1-hexene used here]

In Example 25 it can be seen that other alkyl aluminum reagents can be used in conjunction with chromium oxide catalysts and TPS. In this example, the same catalyst is used as in example 16 is used except that triisobutyl aluminum (TIBA) is used in place of DEALE. When TIBA is used in place of DEALE higher molecular weight polymers are obtained.

Although the specific silica supported chromium oxide catalyst may affect results, it can be seen that when alkyl aluminum or alkyl aluminum alkoxides are used with TPS, lower molecular weight polymers with broader molecular weight distributions and increased high molecular weight shoulders can be obtained without unacceptable losses in catalyst activity due to long induction times and lower activities as found with TPS and chromium oxide catalysts Table 7 illustrates the effect of the addition of silanol and alkyl aluminum alkoxide to chromium oxide-based catalyst on MS 3050-type silica (0.5 wt. % of chromium loading and activated at 700° C.). Addition of TPS and DEALE either in the reactor or on the catalyst results in increased activity and a lowering of polymer molecular weight (examples 34 and 35). Polymer molecular weight distribution did not change but the high molecular shoulder increased significantly based on Mz/Mw values. The activity increased due to elimination of the induction period. Without TPS and DEALE addition this catalyst produces polymer with very low flow index indicative of unacceptably high polymer molecular weight (examples 33).

The results in Table 7 show that more than one kind of silica responds in the same manner to addition of silanols and alkylaluminum alkoxides.

TABLE 7

Effect of TPS and Alkyl Aluminum Compounds on Chromium Oxo Catalyst on MS 3050 Silica

| Examples | Catalyst and modifiers addition method | H2 (scc) | Time (min) | YIELD (g) | FI | Act.gPE/gcat-1 hr | BD | Mn | MW | Mz | DI | Z/W | Den. g/cc |
|---|---|---|---|---|---|---|---|---|---|---|---|---|---|
| | CrOx on MS3050 silica/0.5 wt % Cr; 700 C. activation | | | | | | | | | | | | |
| 33 | none | 500 | 82 | 212 | 1.4 | 695 | 0.35 | 20.9 | 452 | 2.27 | 21.60 | 5.01 | 0.9411 |
| 34 | 1 eq. TPS + 5 eq. DEALE in reactor | 500 | 54 | 188 | 38.0 | 864 | 0.35 | 10.2 | 190 | 1.81 | 18.50 | 9.56 | 0.9585 |
| 35 | 1 eq. TPS + 5 eq. DEALE in catalyst | 500 | 32 | 179 | 64.7 | 1.978 | 0.38 | | | | | | 0.9613 |

[*20 ml 1-hexene used here]

Effect of Silanol on Bimodality of Molecular Weight Distribution

The molecular weight manipulations made possible by the present invention can be extended through the use of dual chromium-based catalysts to increase the level of bimodality in the resulting polyethylene. It is desirable to produce a high density polyethylene in which the side chain branching is primarily found only in the high molecular weight shoulder component of the polymer. This is achieved through the use of a dual catalyst system employing two chromium based catalysts. In one example, there is a catalyst based on chromium oxide on silica or chromium oxide on silica that can be reduced with a trialkyl aluminum compound such as TEAL. The second catalyst is chromium oxide treated with TPS and DEALE. Table 8 provides results for polyethylenes produced with each catalyst separately and with this dual catalyst system all under the same reaction conditions. The use of a TEAL reduced chromium oxide catalyst on 955 silica and activated at 600° C. (example 36) resulted in the formation of polymer with very high molecular weight (Mw>390,000). The density shows that a significant of comonomer was incorporated in the polymer. The use of chromium oxide catalyst on 955 silica and activated at 600° C. followed by treatment with TPS and DEALE (example 37) results in formation of polymer with very low molecular weight (Mw<115,000). The polymer density is very high approaching homopolymer levels indicating little or none comonomer was incorporated into the polymer. Employment of equal amounts of each catalyst (example 38) resulted in formation of a polymer with intermediate molecular weight and density, but with broader molecular weight distributions. This shows that both catalysts were active and that the high molecular weight portion of the polymer would contain the comonomer. In example 39 is seen another catalyst capable of producing low molecular weight polymer with low comonomer incorporation rates. This silylchromate based catalyst that has been reduced with high level of DEALE can be used in conjunction with the chromium oxide catalysts described above that make the high molecular weight, high comonomer containing component.

TABLE 8

Dual Chromium Catalyst System for Bimodal HDPE

| Examples | Catalyst | Catalyst modification | Time (min) | YIELD (g) | Flow Index | Act.gPE/gcat-1 hr | BD | Mn | Mw | Mz | Mw/Mn | Mz/Mw | Den. g/cc |
|---|---|---|---|---|---|---|---|---|---|---|---|---|---|
| | | | Individual Catalyst Components | | | | | | | | | | |
| 36 | CrOx on 955 Silica/0.25 wt % Cr; 600 C. activation | 2 eq. TEAL | 47 | 166 | 0.6 | 865 | 0.35 | 17.5 | 393 | 1.76 | 22.4 | 4.5 | 0.9430 |
| 37 | CrOx on 955 Silica/0.5 wt % Cr; 600 C. activation | 1 eq. TPS 2 eq. DEALE | 36 | 153 | 205.5 | 1,028 | 0.40 | 6.8 | 114 | 1.21 | 16.8 | 10.5 | 0.9623 |
| | | | Catalyst Blend | | | | | | | | | | |
| 38 | 1:1 ratio of catalysts from examples 32 and 33 | | 69 | 163 | 7.1 | 659 | 0.34 | 8.9 | 292 | 1.56 | 33.0 | 5.3 | 0.9509 |
| 39 | Silychromate (0.24 wt. %) on 955 silica dehydrated at 600 C. | 10 eq. DEALE on catalyst | 47 | 155 | 87.0 | 788 | 0.36 | | | | | | 0.9638 |

The dual catalyst system produces a polyethylene having a very broad molecular weight distribution with comonomer incorporation in higher concentration in the high molecular weight region of the distribution. Polymer made with the dual catalyst system would be expected to have improved ESCR properties as well as improved pipe properties.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of producing a supported chromium catalyst comprising:
    combining a chromium compound, with
    a silica-containing support comprising silica selected from the group consisting of silica having:
        (a) a pore volume of about 1.1-1.8 cm$^3$/g and a surface area of about 245-375 m$^2$/g;
        (b) a pore volume of about 2.4-3.7 cm$^3$/g and a surface area of about 410-620 m$^2$/g; and
        (c) a pore volume of about 0.9-1.4 cm$^3$/g and a surface area of about 390-590 m$^2$/g; and,
    then activating said supported chromium compound at 400-860° C., then adding an alkyl silanol; wherein the method further comprises adding titanium tetraisopropoxide to the chromium compound and silica-containing support.

2. The method of claim 1 further comprising adding an organoaluminum compound after the addition of said alkyl silanol.

3. The method of claim 2 wherein said silica has a pore volume of about 2.4-3.7 cm$^3$/g and a surface area of about 410-620 m$^2$/g and said organoaluminum compound is an alkyl aluminum alkoxide compound.

4. The method of claim 2 wherein said silica has a pore volume of about 1.1-1.8 cm$^3$/g and a surface area of about 245-375 m$^2$/g, and said organoaluminum compound is an alkyl aluminum alkoxide compound.

5. The method of claim 2 wherein said organoaluminum compound is added in-situ.

6. The method of claim 2 wherein said alkyl silanol or said organoaluminum compound or both said alkyl silanol and said organoaluminum compound are added in-situ.

7. The method of claim 2 wherein said organoaluminum compound is an alkyl aluminum alkaxide compound.

8. The method of claim 7 wherein said alkyl aluminum alkoxide compound is diethyl aluminum ethoxide.

9. The method of claim 7 wherein said alkyl aluminum alkoxide compound is added in-situ.

10. The method of claim 9 wherein said alkyl aluminum alkoxide compound is diethyl aluminum ethoxide.

11. The method of claim 2 wherein said organoaluminum compound is an alkyl aluminum compound.

12. The method of claim 11 wherein said alkyl aluminum compound is selected from the group consisting of triethyl aluminum, tri-isobutyl aluminum, and tri-n-hexyl aluminum.

13. The method of claim 12 wherein said alkyl aluminum compound is added in-situ.

14. The method of claim 12 wherein said alkyl aluminum compound is tri-isobutyl aluminum.

15. The method of claim 1 wherein said supported chromium catalyst is activated at 600-860° C.

16. The method of claim 1 wherein said alkyl silanol is triphenyl silanol.

17. A process for producing an ethylene polymer comprising the steps of:
    contacting ethylene under polymerization conditions with a catalyst system, said catalyst system produced by a process comprising combining a chromium compound, and a silica-containing support comprising silica selected from the group consisting of silica having:
        (a) a pore volume of about 1.1-1.8 cm$^3$/g and a surface area of about 245-375 m$^2$/g;
        (b) a pore volume of about 2.4-3.7 cm$^9$/g and a surface area of about 410-620 m$^2$/g; and
        (c) a pore volume of about 0.9-1.4 cm$^3$/g and a surface area of about 390-590 m$^2$/g;
    activating said combination at 400-800° C., to form said catalyst system and then adding an alkyl silanol compound to said activated catalyst system, wherein the process farther comprises adding titanium tetraisopropoxide to the chromium compound and silica-containing support; and,
    controlling one or more of catalyst activity, polymer Mz/Mw, polymer Mw/Mn, and polymer density of the resulting ethylene polymer by varying the level of addition of said alkyl silanol.

18. The process of claim 17 wherein said polymer Mw/Mn is controlled to greater than about 15 and said polymer Mz/Mw is controlled to greater than about 5.

19. The process of claim 17 wherein said process for producing said catalyst system further comprises adding an organoaluminum compound after addition of said alkyl silanol.

20. The process of claim 19 wherein said organoaluminum compound is an alkyl aluminum alkoxide.

21. The process of claim 20 wherein said alkyl aluminum alkoxide comprises diethylaluminuin ethoxide.

22. The process of claim 19 wherein said organoaluminum compound is an alkyl aluminum compound.

23. The process of claim 22 wherein said alkyl aluminum compound is selected from the group consisting of triethyl aluminum, tri-isobutyl aluminum, and tri-n-hexyl aluminum.

24. The process of claim 17, wherein said process is a gas phase process.

25. A method of producing a supported chromium catalyst comprising:
    combining a chromium compound, with
    a silica-containing support comprising silica selected from the group consisting of silica having:
        (a) a pore volume of about 1.1-1.8 cm$^3$/g and a surface area of about 245-375 m$^2$/g;
        (b) a pore volume of about 2.4-3.7 cm$^3$/g and a surface area of about 410-620 m$^2$/g; and
        (c) a pore volume of about 0.9-1.4 cm$^3$/g and a surface area of about 390-590 m$^2$/g; and,
    then activating said combination at 400-860° C. to form a chromium catalyst, and
    then adding at least a second chromium-based compound; wherein the method further comprises adding titanium tetraisopropoxide to the chromium compound and silica-containing support.

26. The method of claim 25, wherein said second chromium-based compound is a chromium oxide on silica or an organoaluminum-reduced chromium oxide on silica.

27. The method of claim 25, wherein an alkyl silanol is added after said activation and before said addition of said second chromium-based compound.

28. The method of claim 27, wherein said second chromium-based compound is a chromium oxide on silica or an organoaluminum-reduced chromium oxide on silica.

* * * * *